United States Patent [19]
Mölne

[11] Patent Number: 6,014,561
[45] Date of Patent: Jan. 11, 2000

[54] METHOD AND APPARATUS FOR OVER THE AIR ACTIVATION OF A MULTIPLE MODE/BAND RADIO TELEPHONE HANDSET

[75] Inventor: Anders Lennart Mölne, Raleigh, N.C.

[73] Assignee: Ericsson Inc., Research Triangle Park, N.C.

[21] Appl. No.: 08/646,711

[22] Filed: May 6, 1996

[51] Int. Cl.[7] .............................. H04Q 7/20; H04B 1/38
[52] U.S. Cl. ..................... 455/419; 455/552; 455/553
[58] Field of Search ................................. 455/419, 418, 455/553, 558, 403, 552

[56] References Cited

U.S. PATENT DOCUMENTS

| | | | |
|---|---|---|---|
| 5,297,191 | 3/1994 | Gerszberg | 455/419 |
| 5,297,192 | 3/1994 | Gerszberg | 455/419 |
| 5,524,135 | 6/1996 | Mizikovsky et al. | 455/419 |
| 5,603,084 | 2/1997 | Henry, Jr. et al. | 455/419 |
| 5,642,378 | 6/1997 | Denheyer et al. | 455/553 |
| 5,710,986 | 1/1998 | Obayashi et al. | 455/553 |
| 5,722,084 | 2/1998 | Chakrin et al. | 455/419 |
| 5,742,910 | 4/1998 | Gallant et al. | 455/558 |
| 5,754,954 | 5/1998 | Cannon et al. | 455/419 |
| 5,781,612 | 7/1998 | Choi et al. | 455/553 |
| 5,794,141 | 8/1998 | Zicker | 455/418 |

*Primary Examiner*—Dwayne D. Bost
*Assistant Examiner*—Tracy M. Legree
*Attorney, Agent, or Firm*—Charles L. Moore, Jr.

[57] ABSTRACT

The present invention provides a method and apparatus for over the air activation of a multiple mode/band radio telephone. The method includes the steps generating at least one message containing instructions and predetermined activation information for a first mode/band of operations and at least one second mode/band of operation; sending the at least one message over the air from a communication network to the handset to activate the handset for operation in the first mode/band of operation and in the at least one second mode/band of operation; and storing the activation information in at least one selected memory area. The present invention further includes a multiple mode/band radio telephone handset programmed to carry out the preceding process steps in conjunction with a communications system programmed for over the air activation.

24 Claims, 5 Drawing Sheets

METHOD AND APPARATUS FOR OVER THE AIR ACTIVATION OF A MULTIPLE MODE/BAND RADIO TELEPHONE HANDSET

BACKGROUND OF THE INVENTION

The present invention relates generally to radio frequency (RF) communications, and more particularly, to a method and apparatus for activating a multiple mode/band radio telephone handset over the air (OTA-A).

New digital cellular systems, commonly known as Personal Communications Systems (PCS), are being introduced into North America and other parts of the world. PCS in the United States operates at a frequency band of about 1850–1990 MHz so as not to interfere with the existing cellular frequency band of about 800–900 MHz. PCS provides enhanced features compared to existing cellular systems, such as short message service (SMS), voice mail, call forwarding and other features. One of the standards adopted by the FCC for PCS in the United States is referred to as PCS1900, which is similar to standards used in other parts of the world, such as DCS1800 (Digital Cellular System at 1800 Mhz). Both PCS1900 and DCS1800 are based on the GSM (Global System for Mobile Communications) adopted by the European Standards Institute (ETSI).

PCS and similar enhanced digital cellular communications systems are not currently available in all geographic areas. Accordingly, to provide seamless wireless communications, particularly in the U.S., mobile radio telephones are being manufactured which can operate in either analog or digital modes and also in either the PCS band (1850–1990 Mhz) in the digital mode or the cellular band (800–900 MHz) in the analog mode. These dual mode/band telephones accommodate those users who desire the enhanced features provided by PCS when available and also provide seamless wireless communications when the user is roaming in a geographical area where PCS is not available.

PCS1900 handsets can be conveniently activated over the air with the help of short message service (SMS)as provided by the GSM specification or standard. Today, a buyer can purchase a PCS1900 handset and leave the store without doing anything. The handset is already equipped with a Subscriber Identity Module (SIM) card with subscriber information already loaded on the SIM, such as the International Mobile Subscriber Identity (IMSI) which is also programmed into the home location register (HLR) of the network from which the subscriber obtains his subscription for service and is assigned a telephone number during activation. This is referred to as the subscriber's home network.

The IMSI, however, is not fully activated when the subscriber leaves the point of purchase. When the new subscriber attempts to make his first telephone call, the IMSI is sent to the network and the network identifies the subscriber as a new subscriber from the IMSI and automatically routes the call to a customer service center. The customer service center programs the needed information into the system provider's billing system to fully activate the subscription and assigns a telephone number, commonly referred to as a Mobile Station International Integrated Services Digital Network (ISDN) number or MSISDN. This number is not actually used within the PCS1900 system; a call to a specific MSISDN is converted by the HLR to a corresponding Mobile Station Roaming Number (MSRN) which is translated by the system into the IMSI. The MSISDN is the only number that the subscriber will use, however, and is downloaded by the system via a SMS Class 2 message to a specific memory area in the SIM for future user access. Thus, the handset or telephone is only used as a transport device for this subscriber information during activation so that the information can be stored on the SIM card for retrieval and use by the handset. The subscriber, via the user interface (keypad, display, etc.) of the handset, can access the specific memory area where the MSISDN is stored. The activation process for the PCS1900 handset is now complete.

The purchaser of a cellular analog handset, such as an AMPS telephone, requires the assistance of the seller to activate the handset. To activate the AMPS handset or NAM (number assignment module)-program the handset, the MIN (mobile identification number) and the SID (home system identification number) and, if required by the system, an A-key (security number), must be programmed using the keypad of the user interface according to a routine specified by the manufacturer of the handset. This requirement that the handset be programmed by the seller is a limitation to the sales procedure of AMPS or analog telephones because the handset cannot be sold off the shelf as a PCS1900 handset can. Programming of the AMPS handset is critical. Without the assistance of trained and experienced sales personnel, the inexperienced purchaser can make mistakes in the programming process which can lead to inconvenience and frustration for the new handset purchaser. Additionally, the MIN, Electronic Serial Number (ESN) of the handset and the A-key must be programmed into the system database (HLR and billing system) before the handset can be used. Specifically, the majority of activation's are given the same value for the NAM parameters, Group Identification (GID), Local Control (LC), Mobile Station Number (MSN), and Access Overload Class (ACCOLC) and only the MIN, SID, and A-key are given user-specific values. During a typical activation process, the new user will choose or be assigned a telephone number or MIN. This number is programmed into the handset, typically via the keypad by the sales person. The cellular provider or operator's specific identity number or SID is then programmed into the handset by the sales person. Some service providers or operators may have also implemented a security authentication algorithm; for example, a 6 to 26 digit A-key is entered or a pre-programmed default number is entered for security purposes. To complete the activation process, the permanent electronic serial number (ESN) of the handset, the chosen MIN, the A-key and any additional subscriber data is communicated by the sales person to the service provider or operator who then programs the relevant data into the appropriate system nodes.

Presently, the analog or AMPS portion or side of a dual mode/band radio telephone handset cannot be activated over the air and must be activated, as described above, by an experienced sales person at the point of sale to eliminate possible programming errors. This results in delays and inconvenience in the purchasing process and requires trained personnel at the point of sale even though the digital or PCS portion or side of the handset can be over the air activated.

Accordingly, it is a primary object of the present invention to provide a multiple mode/band radio telephone handset which is not subject to the foregoing disadvantages.

It is another object of the present invention to provide over the air programming of the AMPS, TACS, ETACS, or NMT portion of a dual mode/band radiotelephone handset in conjunction with the over the air activation of the PCS1900, DCS1800 or GSM portion of the handset.

It is a further object of the present invention to provide a system and method for over the air activation of all modes and bands of operation of a multiple mode/band radio telephone handset.

These and other objects of the present invention, together with the features and advantages thereof, will become apparent from the following specification when read with the accompanying drawings in which like reference numerals refer to like elements.

SUMMARY OF THE INVENTION

In accordance with the present invention, a method for over the air activation (OTA-A) of a multiple mode/band radiotelephone handset includes the steps of generating at least one message containing instructions and predetermined activation information for a first mode/band of operation and at lest one second mode/band of operation; sending the at least one message over the air from a communications network to the handset to activate the handset for operation in the first mode/band of operation and the at least one second mode/band of operation; and storing the activation information in at least one selected memory area.

In an alternate embodiment, at least a portion of the information to activate the handset for a second mode of operation may be pre-stored in one or more selected memory locations in the handset or SIM card and may be retrieved during over the air activation and sent by the handset to a first communications system. This information is then transferred from the first system to one or more other systems to permit the handset to operate in the second mode/band of service provided by any of the other systems operating in the same mode and band.

In further accordance with the present invention, a multiple mode/band radiotelephone handset includes a first circuit for operating in a first communications system based on one of PCS1900, DCS1800 or GSM standards and a second circuit, for operating in a second communications system based on one of AMPS, TACS, ETACS and NMT standards. The handset further includes an operator interface for alternatively connecting to the first circuit and the second circuit and means for activating the handset over the air by the service provider for operation alternatively in the first and second communications systems without operator or user interaction other than making an initial telephone call.

DETAILED DESCRIPTION OF THE PREFERRED EMBODIMENTS

Figure 1:
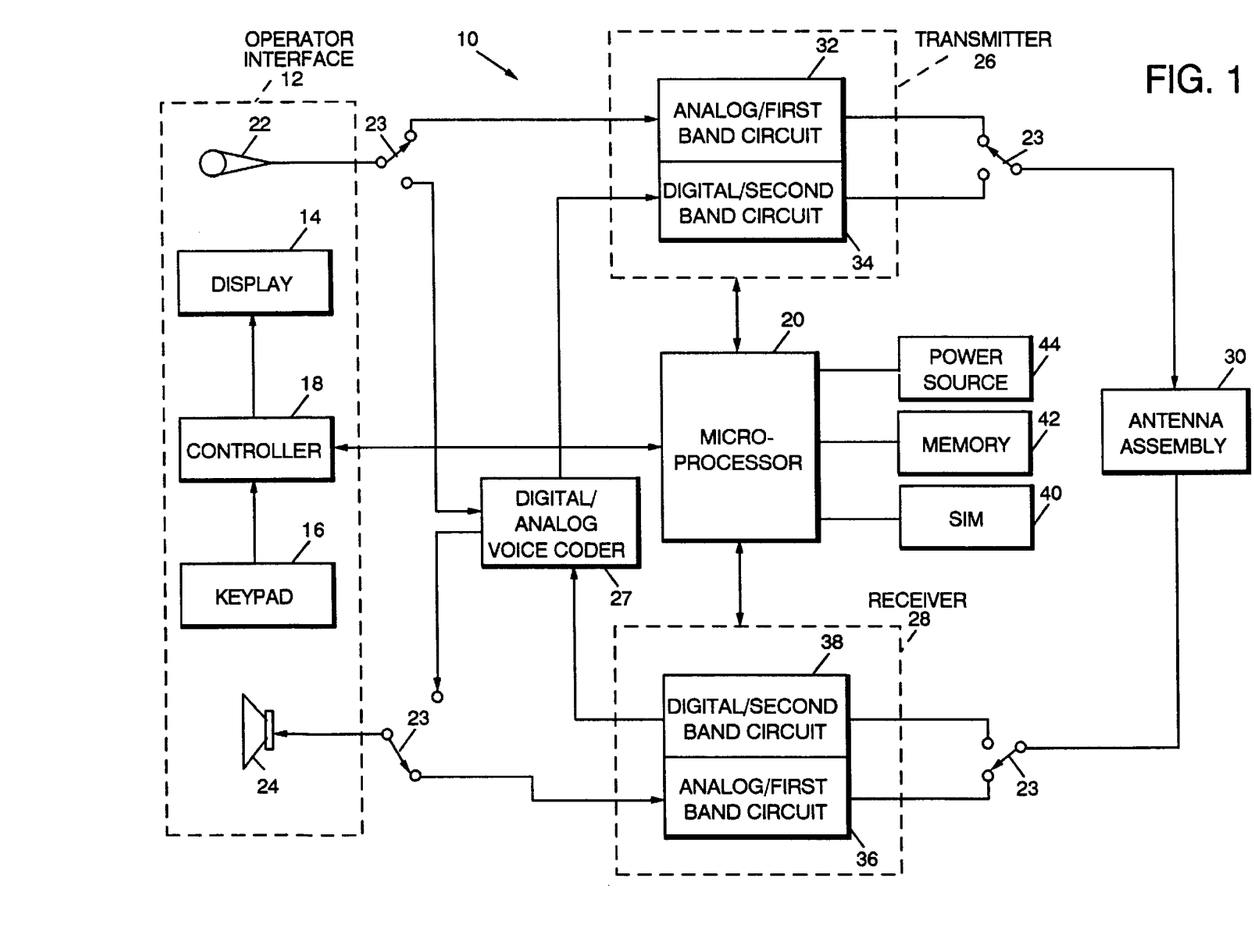
FIG. 1 is a block schematic diagram of a dual mode/band radiotelephone handset in accordance with the present invention.

Referring initially to FIG. 1, a radiotelephone handset 10 having an architecture for operating alternatively in either the digital mode at the PCS frequency band or in the analog mode at the AMPS cellular frequency band includes an operator interface 12 containing a display 14 to provide visual signals to the subscriber or user as to the status of the handset 10 and a keypad 16 which permits the subscriber to communicate commands to the handset 10. A control unit 18 is provided to interface between the display 14 and keypad 16 and a microprocessor 20 controls operation of the handset 10 under a stored program. The microprocessor 20 encodes and decodes control signals and performs call processing procedures. The operator interface 12 also contains a microphone 22 and a speaker 24. When operating in the analog mode, the microphone 22 receives audio signals from the user and converts the audio signals to analog signals for transmission to a transmitter 26 of the handset 10, and the speaker 24 receives analog signals from a receiver 28 of the handset 10 and converts the analog signals to audio signals which can be understood by the subscriber.

When operating in the digital mode, electronic switches 23 or the like under microprocessor control are operated to transfer the analog signals from the microphone 22 to a digital/analog voice coder 27. The voice coder 27 converts the analog signals to compressed digital signals which are thereafter sent to the transmitter 26. In the receive path, compressed digital signals from the receiver 28 are converted by the voice coder 27 to analog signals which are sent to the speaker 24.

The transmitter 26 and the receiver 28 are each coupled to an antenna assembly for transmitting and receiving RF signals. The antenna assembly 30 matches the impedance of the transmitter 26 and the receiver 28 in order to permit transmission and reception of RF signals.

In accordance with the present invention, the transmitter 26 includes an analog circuit 32 operating at a first frequency band. The analog circuit 32 processes and transmits analog signals to the antenna assembly at a first frequency band which may be the AMPS cellular band of about 800–900 Mhz. The analog circuit 32 has a design structure similar to that of conventional analog radiotelephones operating according to AMPS, TACS, ETACS, NMT or similar analog standards.

The transmitter 26 also includes a digital circuit 34 operating at a second frequency band, such as the PCS band of about 1850–1990 Mhz. The digital circuit 34 has a design structure similar to conventional radio telephones operating according to D-AMPS (IS-136), PCS1900, DCS1800, GSM, CDMA, TDMA, PDC, DCT or similar digital standards.

Similarly, the receiver 28 includes an analog circuit 36 operating at a first frequency band, such as the cellular band of 800–900 Mhz and a digital circuit 38 operating at a second frequency band, such as the PCS band of 1850–1990 Mhz. Thus, if the handset 10 is operating within an analog cellular system, the analog/first band circuit 32 of the transmitter 26 and the analog/first band circuit 36 of the receiver 28 will be operational to transmit and receive signals from the analog communications system. If the handset 10 is operating within a PCS system or the subscriber prefers to communicate on an available PCS system, if an analog system is also available, the digital/second band circuit 34 of the transmitter 26 and the digital/second band circuit 38 of the receiver 28 will be active for communicating with the PCS system.

The dual mode/band handset 10 also includes a subscriber identity module (SIM) card 40 for storing information for operation of the handset 10 in both PCS and conventional AMPS communications systems, and the handset 10 may further include an AMPS memory 42 for containing information and controlling operation of the handset 10 when operation in the AMPS mode is selected or desired. The SIM card 40 and AMPS memory 42 are connected to the microprocessor 20 for retrieval of the appropriate information as required for whichever type system the handset 10 is communicating within. SIM cards are described in more detail in the Specification of the Subscriber Identity Module-Mobile Equipment (SIM-ME) Interface (GSM 11.11) by ETSI and is incorporated herein by reference.

The microprocessor 20 operating under stored program control coordinates the operation of the transmitter 26 and the receiver 28 for proper operation of the handset 20 according to whatever type system or systems are available to the subscriber for communication and according to which system the subscriber may have selected or preprogrammed for the most efficient and economical communications. The microprocessor 20 inserts and extracts control messages, changes physical parameters, such as channel frequencies, mode of operation, frequency band, and communicates with the operator interface 12 to permit the subscriber to command and control operation of the handset 10. The microprocessor 20 is powered by a power source 44 or battery which also supplies power to the operator interface 12, the transmitter 26, and the receiver 28.

Figure 2:
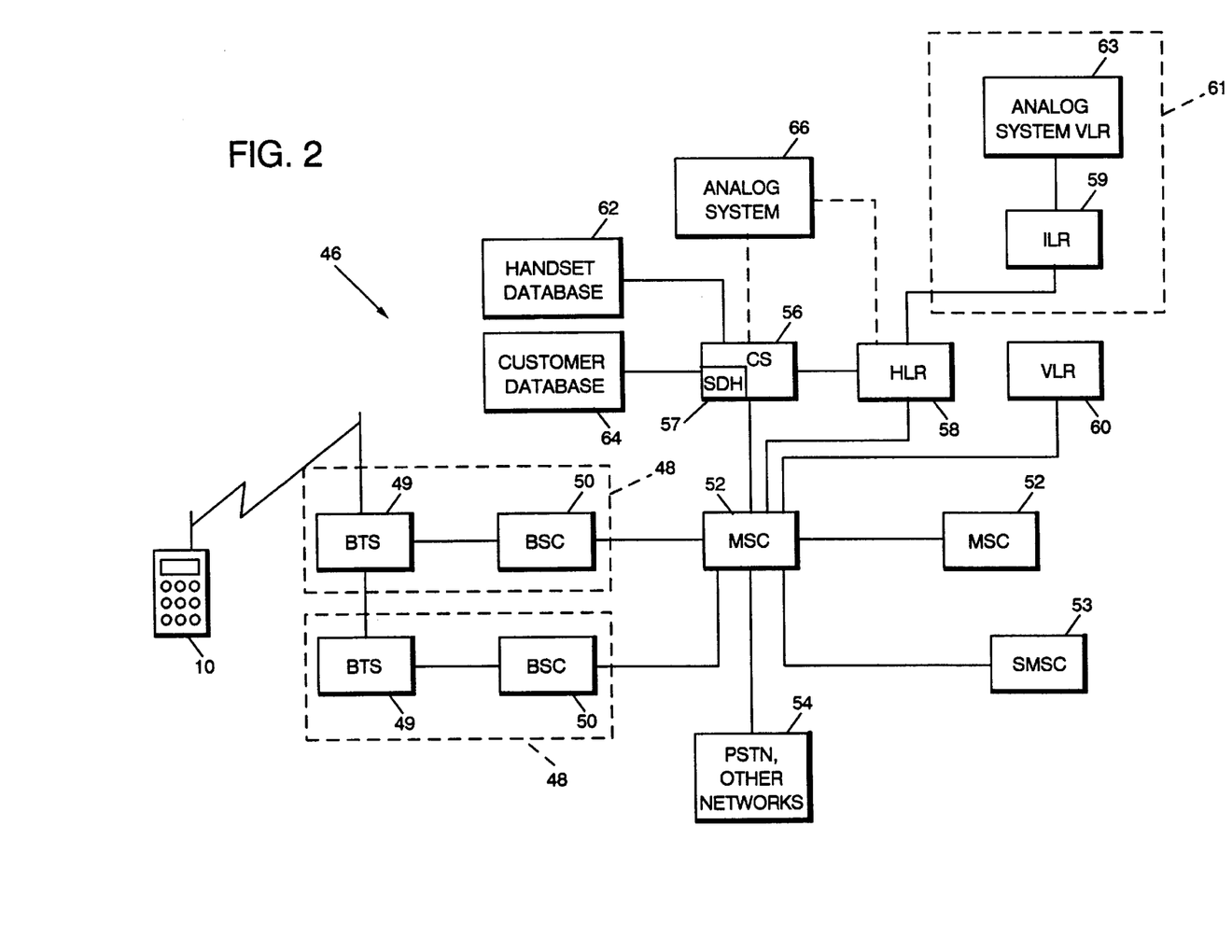
FIG. 2 is a block schematic diagram of a PCS1900 or similar digital system coupled to an AMPS or similar analog system for over the air activation of both the PCS1900 and AMPS portions of the handset of FIG. 1 in accordance with the present invention.

Referring also to FIG. 2, a typical PCS1900 system 46 includes at least one base station 48 for communication via a selected channel with the radiotelephone handset 10. The base station 48 includes a base transceiver station (BTS) 49 which is electrically connected to a base station controller (BSC) 50. The BSC 50 is electrically connected to a mobile switching center 52 which switches telephone calls between different base station controllers 50, the public switch telephone network 54 (PSTN) or other networks, and other MSC's 52. The MSC 52 is also connected to a home location register (HLR) 58 which stores subscriber information for those subscribers or users who have subscribed for service from this particular system or network, which is known as the subscriber's home system or network. The MSC 52 is also connected to a visitor location register 60 which stores and maintains information on subscribers from other home systems which are roaming within the present system. PCS1900 systems are specified in the standard J-STD-007 by the Joint Technical Committee (JTC) which may be referred to for more detailed information and is incorporated herein by reference.

In accordance with the present invention, the customer service center 56 has access to at least two databases, a handset database 62 and a customer database 64. The handset database 62 is preprogrammed with the electronic serial number (ESN), an international mobile equipment identity (IMEI) number of the handset 10, international mobile subscriber identity (IMSI) number of the SIM card 40 that is provided with the handset 10 and possibly other information which can be accessed by the customer service center 56 using the international mobile subscriber identity (IMSI) number as will be described in more detail hereinbelow. The customer database 64 is used for storing activation information from the handset database 62 where it is temporarily stored until transferred by the customer service center 56 to the customer database 64 of the home system of the subscriber during the handset activation process as described in more detail hereinbelow.

In accordance with the present invention, the customer service center 56 is also connectable to an AMPS or similar analog system 66 to permit transfer of any required subscriber information to the AMPS system 66 for complete activation of the handset 10 for operation on this AMPS system 66 or any other AMPS system when authorized while roaming.

Figures 3, 3A:
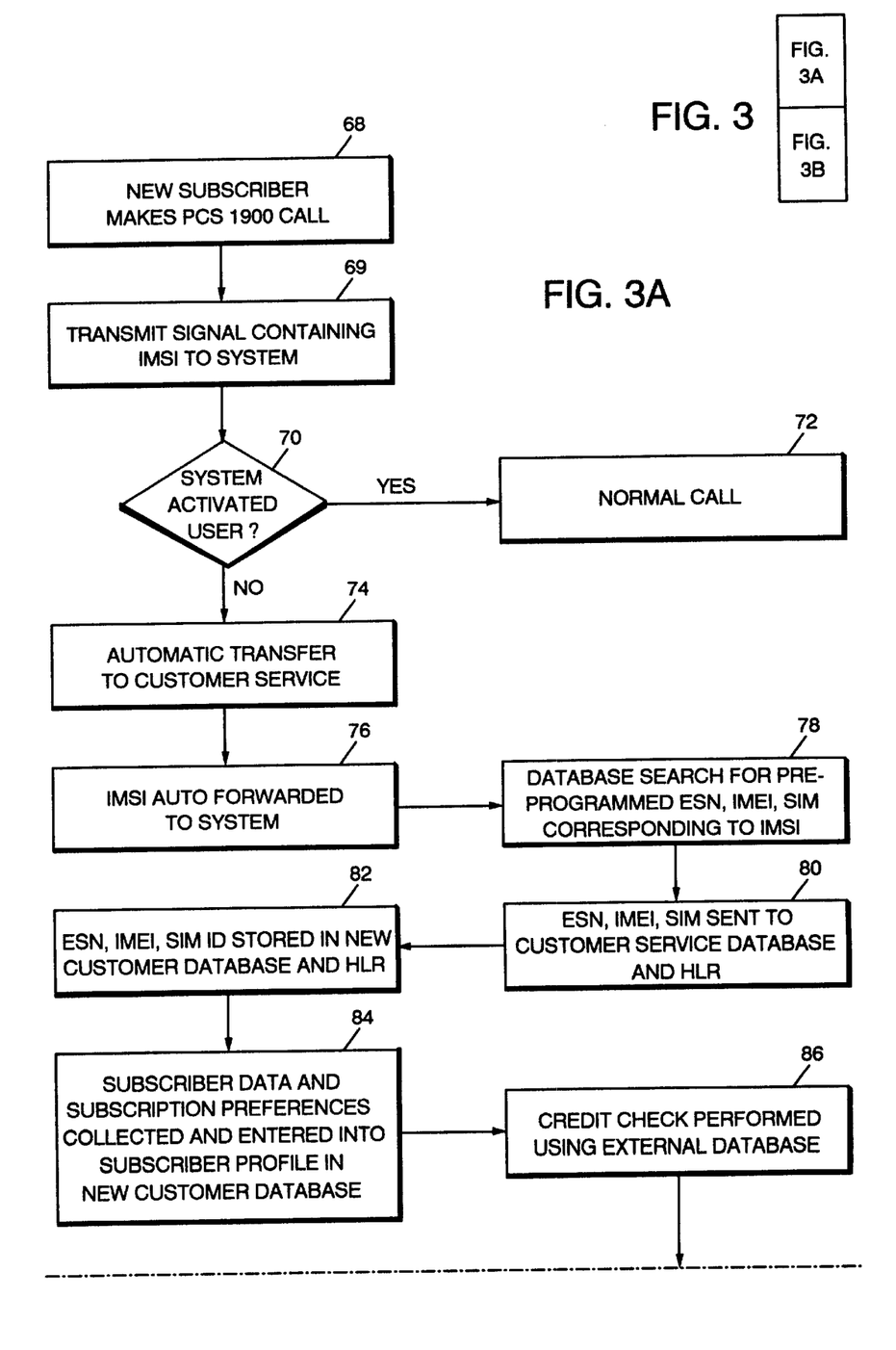
FIGS. 3A and 3B are a flowgraph of the method of over the air activation of the dual mode/band handset of FIG. 1.

In accordance with the present invention, over the air activation of the typical dual mode/band handset 10 of FIG. 1 will be described with reference to FIGS. 3A, 3B and 4. When a new subscriber makes a PCS1900 telephone call (Block 68) a signal containing an international mobile subscriber identity (IMSI) is transmitted from the handset 10 to the base station 48 of the communications system 46 (Block 69). The system 46 determines from the IMSI whether the handset 10 has been previously activated for operation on the system. If the handset 10 has been activated, then the call is normally processed (Block 72). If the handset 10 has not been activated by the system 46, the handset 10 is automatically connected to the customer service center 56 (Block 74) for over the air activation of both the PCS1900 and AMPS portions of the handset 10. The IMSI is transferred to the customer service center 56 (Block 76) and a customer service center employee searches the handset database 62 for previously stored activation information, such as ESN, IMEI (international mobile equipment identity) and possibly other information required for activation, such as the serial numbers of the SIM card 40 and handset 10 (Block 78). Information is stored in the handset database 62 by the handset 10 manufacturer for later recall by the subscribing system after the handset 10 is sold to a new user. Once the information is retrieved from the handset database 62, it may be deleted to provide storage capacity for newly manufactured handsets/SIM cards.

Once the preprogrammed ESN and IMEI are found using the IMSI to index into the handset database 62, the subscriber information is sent to the customer service center 56 and is stored in the customer service database 64 and the HLR 58, Blocks 80 and 82. Additional information such as subscriber data and subscription preferences, such as voice mail, call forwarding and other features desired by the subscriber, are collected and entered into the subscriber's profile within the database 64 (Block 84). At this same time, another external database (not shown) may be accessed to perform a credit check on the subscriber as indicated by Block 86. The results from the credit check database are then returned to the customer service center 56 in Block 88 and the type of subscription is determined using the information received in Block 90.

The subscriber can then select a telephone number or is assigned a telephone number by the customer service representative in Block 92. At this point, the subscriber-operator interaction is terminated (Block 92). The subscriber information in the database is then processed in Block 94 to establish the subscriber profile for activation of the handset 10. The subscriber telephone number will serve as both MSISDN in any PCS1900 network as well as the MIN in any AMPS network, that is, incoming calls will be automatically routed to the network where the handset 10 is registered independent of the standard (PCS1900 or AMPS) on which the system is operating.

The other data needed to activate the AMPS portion of the handset 10 is either generated or has been generated earlier and stored on the SIM card 40 (FIG. 1) during manufacturing and is transferred to the system 46 during the database search in Block 78. The system 46 may then transfer the activation information to the AMPS or analog system 66 (FIG. 1) to activate the handset 10 for operation in that system or other systems operating according to the same standard. The following indicates the activation information and how it is programmed into either the system 46 or the handset 10:

| Activation Information: | |
|---|---|
| PCS1900: | |
| MSISDN | Assigned (Block 92) and downloaded OTA by SMS (Block 96) |
| IMSI | Preprogrammed on SIM |
| HPLMN | Home public land mobile network (PLMN) (first 6 digits of the MSISDN) |
| Other information | Preprogrammed on SIM |
| AMPS: | |
| ESN | Stored in handset during manufacturing |
| A-key (6–26 digit authentication key) | Downloaded OTA by SMS (Block 96) or pre-programmed on SIM |
| MIN * | Downloaded OTA to SIM (Block 96) |
| SID *, ** | Pre-programmed on SIM or downloaded OTA by SMS (Block 96) |
| GID * | Pre-programmed in handset memory |
| LC * | Pre-programmed in handset memory |
| MSN * | Pre-programmed in handset memory |
| ACCOLC * | Pre-programmed in handset memory |
| Other information | (such as PSIDs and RSIDs) pre-programmed on SIM, downloaded OTA or both |

\* Parts of the number assignment module (NAM) programming, although all information except SID and MIN are usually pre-determined.
\*\* Note that the operator may not have an AMPS system network and that the SID may be a fictive SID or a indication of whether the A side or the B side is the side that should be considered the "home" side of the cellular band.

The network based activation will include a completed customer profile in the customer service database 64, as well as, activation of the subscriber's relevant data in the HLR 58, billing system and possibly other sub-systems and databases depending upon the architecture of the particular system.

For an operator that only provides PCS1900 service, the subscriber will typically be activated in the HLR 58 only and an interworking location register (ILR) 59 will serve as the link between the PCS1900 system 46 and an AMPS system 61 where the dual mode/band handset 10 may be roaming. When the dual mode/band handset 10 is roaming in the AMPS system 61, the MIN and SID transmitted to the AMPS system 61 by the handset 10 informs the visited AMPS system 61 of the location of the HLR 58 of the handset's home system. A VLR 63 of the AMPS system 61 establishes contact with the ILR 59 and the ILR 59 will obtain the necessary roaming information from the PCS1900 HLR 58. The ILR 59 then sends the roaming information to the AMPS VLR 63. The PCS1900 system 46 sees the ILR 59 as the AMPS system's VLR and the AMPS system 61 sees the ILR 59 as the PCS1900 system's HLR.

For a network operator with both PCS1900 46 and AMPS 66 systems, the subscriber may be activated in both the PCS1900 and AMPS HLR 58. One HLR 58 will serve as the main data source for both networks and incomong calls will be routed to it.

If the AMPS activation information has not been previously stored in the SIM card 40 as described above, when the subscriber file has been created, the missing AMPS activation information and PCS1900 activation information is copied into one or multiple SIM specific (SMS Class 2) messages as indicated by Block 96. The message or messages are sent to a short message service center (SMSC) 53 (FIG. 2) where the Class 2 SMS messages are generated as indicated by Block 98 and transferred to the handset according to standard SMS procedures, Block 100. When the messages are received by the handset 10 in Block 102, acknowledgment will be sent to the SMSC 53 (Block 103) and typically forwarded to a subscriber database handler 57 (Block 104) of the customer service center 56. The subscriber database handler 57 is programmed to provide a monitor and control function that insures that the over the air activation is being accomplished.

Figure 4:
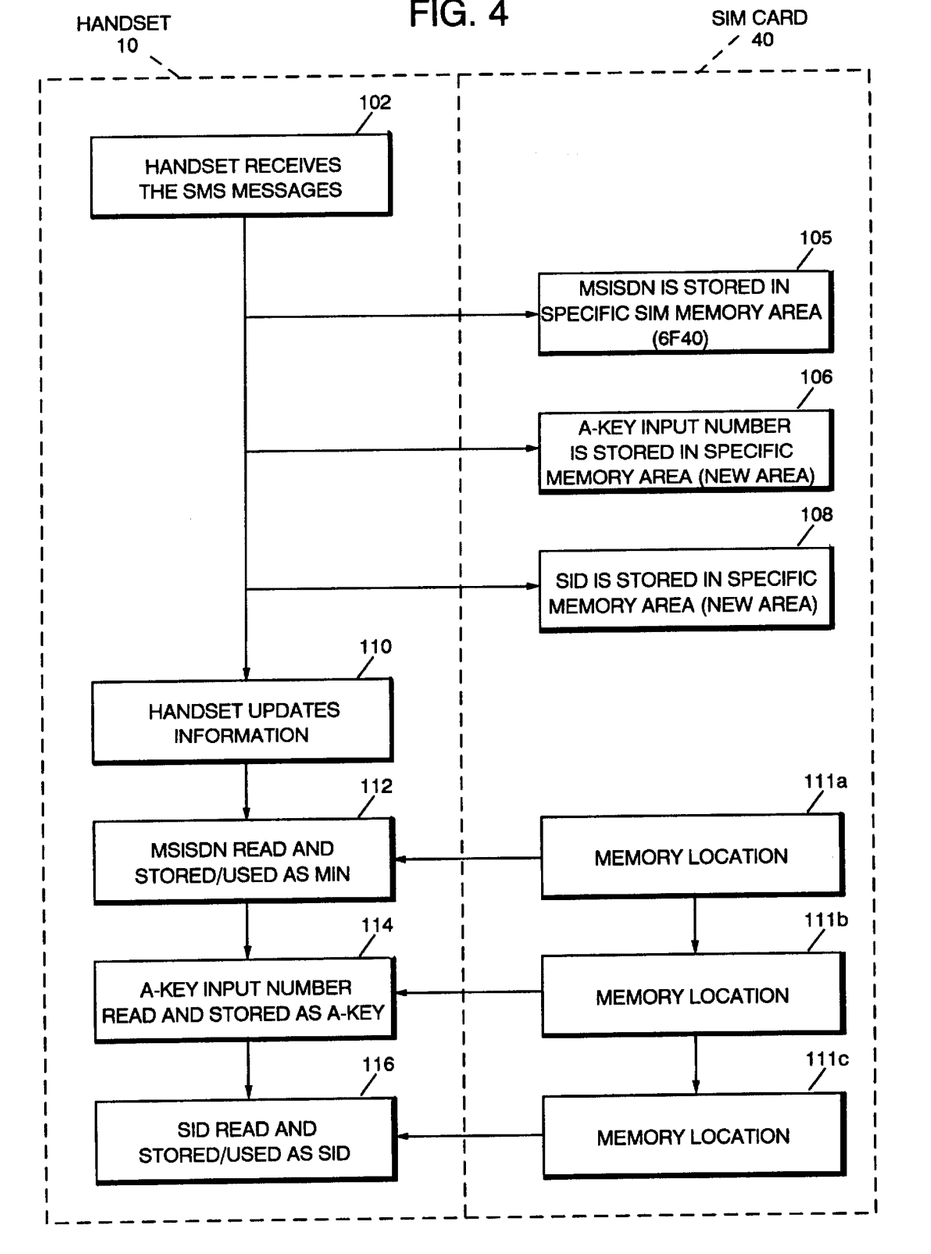
FIG. 4 is a flowgraph illustrating where activation information may be stored and recalled in the dual mode/band radiotelephone handset and SIM card of FIG. 1.

Referring also to FIG. 4, when the handset 10 has received the SMS in Block 102, the information will automatically be stored in the assigned memory locations within the SIM card to activate the handset 10 for operation in both the PCS1900 mode/band and the AMPS mode/band. For example, the MSISDN is stored in a memory area designated by 6F40 (Block 105) for PCS1900 operation. Those skilled in the art will recognize that the handset 10 can have multiple MSISDN's and MIN's. It is expected that the same subscriber number may be used for both PCS1900 operation and AMPS operation. In this situation, $MIN_1$ will be the same as $MSISDN_1$, $MIN_2$ will be the same as $MSISDN_2$ and so forth for however many systems in which the subscriber is registered. If for some reason it is required that the subscriber number for PCS1900 (MSISDNs) be different from the subscriber number for AMPS (MIN), this could be supported because the SIM card 40 (FIG. 1) can store at least 4 MSISDNs/MINs or a new memory area can be designated on the SIM 40 where the NAM can be stored.

The input number to the A-key may be stored in a specific predetermined memory location 106 by over the air downloading (using a SMS Class 2 message)or it can be preset by the operator and pre-stored in the predetermined memory location 106 on the SIM card 40. In either situation, the network database 64 will have access to the number and can generate the same A-key as the handset 10. The number in the specific memory location 106 is read by the handset 10 and the A-key is created and stored.

Figure 3B:
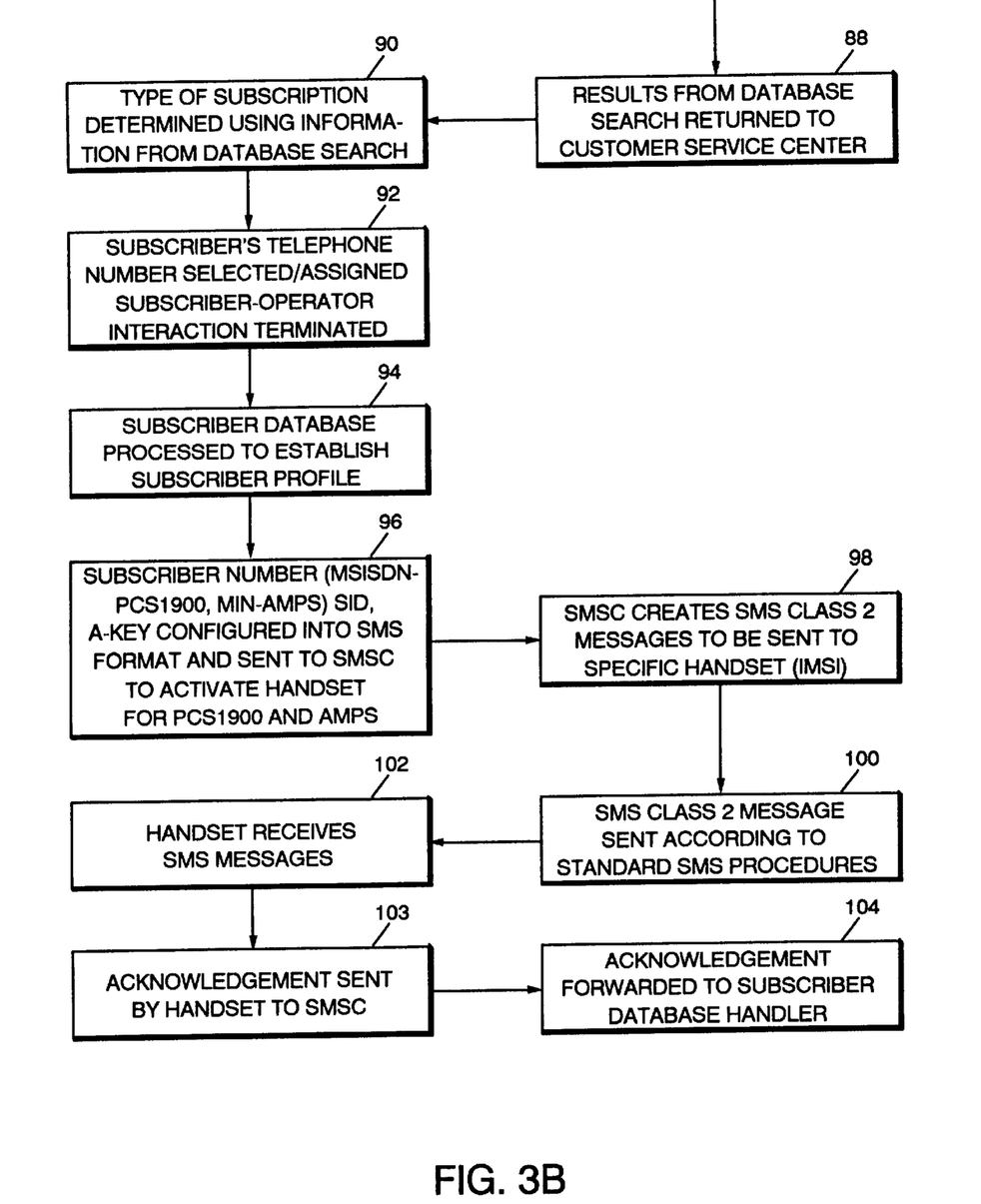

If the SID or number representing the equivalent information is not preprogrammed by the operator, it is downloaded over the air via SMS format and will be stored in a predetermined memory location in the handset 10 or SIM card 40 as indicated by Block 108 in FIG. 3B.

The handset 10 does not know or control the information in SIM specific messages (SMS Class 2) and must therefore scan the SIM card's memory locations 111a, b and c that may be affected during an over the air activation in order to update the identity of any information that may have changed (Blocks 112, 114, 116). All needed SIM card information is also uploaded each time the handset 10 is powered-up.

The handset 10 may be programmed to upload the SIM information and store it in a permanent memory, such as memory 42 in FIG. 1 or to keep it in permanent memory in the SIM 40. When the handset 10 is being operated, information may be uploaded from the SIM, Blocks 112, 114 and 116, into the operating memory 42 or may only be uploaded with the appropriate information when the AMPS mode is selected. Having the information always uploaded may be preferable because this will lower the search times during roaming when both AMPS and PCS1900 frequencies are being scanned.

It should be noted that the database handling procedures of the subscriber information described herein with respect to FIGS. 2, 3A, 3B and 4 are exemplary of one way of handling the different identification numbers and subscriber information in setting up the customer's service profile and activating the dual mode/band handset 10 over the air. Other schemes for manipulating the subscriber information may exit without departing from the basic features of the present invention, namely, to activate the AMPS (NMT or TACS) portion of a dual mode/band phone over the air along with the PCS1900 (DCS1800 or GSM) portion utilizing the memory storage features of the SIM card 40 and the SMS class 2 message functionality associated with PCS1900.

While the present invention has been described with respect to a dual mode/band handset 10 operating in either AMPS or PCS1900 modes/bands, those skilled in the art will recognize that the features of the present invention may be applied to any dual or multiple mode/band handset that has the support of a digital cellular standard, such as D-AMPS (IS-136)/AMPS, GSM/AMPS, CDMA/AMPS, PDC/AMPS, DCT/AMPS or similar combinations and that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from substance or scope of the invention. While the present invention has been described herein in detail in relation to its preferred embodiments, it is understood that this disclosure is only illustrative and exemplary of the present invention and is merely for purposes of providing a full and enabling disclosure of the invention. Accordingly, it is intended that the invention be limited only by the spirit and the scope of the claims appended hereto.

What is claimed is:

1. A method for over the air activation of a multiple mode radio telephone handset, comprising the steps of:

generating at least one message containing instructions and predetermined activation information for a first mode of operation and at least one second mode of operation;

sending the at least one message over the air from a communication network to the handset to activate the handset for operation in both the first mode of operation and the at least one second mode of operation;

storing the activation information in at least one selected memory location; and wherein the predetermined activation information comprises a mobile station numbers stored in subscriber identity module (SIM) card for operation in the first mode of operation and wherein the mobile station number is used in a number assignment module (NAM) for operation in the at least one second mode of operation.

2. The method of claim 1, wherein the first mode of operation corresponds to one of PCS1900, DCS1800 and GSM, and the second mode of operation is one of AMPS, TACS, ETACS and NMT.

3. The method of claim 1, wherein the at least one message is a short message service (SMS) Class 2 message.

4. The method of claim 1, wherein at least one selected memory location is a memory area in a subscriber identity module (SIM) card.

5. The method of claim 1, wherein the predetermined activation information comprises a mobile station integrated service digital network number (MSISDN) for operation in the first mode and a 5 system identification (SID) number for operation in the at least one second mode.

6. The method of claim 5, wherein the predetermined activation information further comprises an A-key, and further comprising the step of storing the A-key in a predetermined memory area of the SIM card.

7. The method of claim 5, wherein the step of storing the activation information comprises the steps of storing the MSISDN in a first predetermined memory area of a subscriber identity module (SIM) card and storing the SID in a second predetermined memory area of the SIM card.

8. The method of claim 7, further comprising the step of storing the MSISDN and the NAM in different memory areas of the SIM card.

9. The method of claim 7, wherein the SIM card comprises a plurality of dedicated memory areas for storing different MSISDNs and mobile identity numbers (MINs) for operation of the handset in the at least one second mode of operation, said MIN being different from the MSISDN for operation in the first mode and the MIN being stored in a different one of the plurality of SIM card dedicated memory areas for MSISDNs.

10. The method of claim 1, further comprising the step of pre-storing a SID number on a SIM card for use with the handset.

11. The method of claim 1, further comprising the step of pre-storing an A-key on a SIM card for use with the handset.

12. The method of claim 1, wherein the first mode of operation is in one frequency band and the second mode of operation is in another frequency band.

13. A method for over the air activation of a multiple mode radio telephone handset, comprising the steps of:

activating the handset over the air in a first communications system for a first mode of operation;

sending activation information from the handset to the first communication system to activate the handset for at least a second mode of operation; and sending the activation information from the first system to at least one second system to permit the handset to operate in the second mode of operation.

14. The method of claim 13, wherein the steps of sending predetermined information to the handset comprises the step of generating and transmitting to the handset at least one short message service (SMS) class 2 message.

15. A method for over the air activation of a multiple mode radiotelephone handset, comprising the steps of:

(a) operating the handset to make a telephone call;

(b) transmitting a signal containing mobile subscriber identity information from the handset to a mobile communications system;

(c) determining if the call is from an activated handset by using the mobile subscriber identity information;

(d) connecting the subscriber to a customer service center, if the call is not from an activated handset;

(e) transferring the mobile subscriber identity information to the customer service center;

(f) searching a handset database for previously stored activation information associated with the mobile subscriber identity information;

(g) sending the activation information to a customer service database;

(h) assigning a telephone number to the handset for use in all modes of operation;

(i) activating the handset for a first mode/band of operation;

(j) generating predetermined information to activate the handset for a second mode of operation;

(k) sending the predetermined information to the handset; and (l) storing the predetermined information at a selected memory location to permit the handset to operate in the second mode of operation when selected.

16. The method of claim 15, wherein step (k) comprises the step of generating and sending at least one short message service (SMS) Class 2 message.

17. The method of claim 15, wherein step (l) comprises the step of storing the predetermined information in at least one selected memory location in a subscriber identity module (SIM) card.

18. The method of claim 15, further comprising the step of preprogramming selected information into a memory means of the handset.

19. The method of claim 18, wherein the preprogramming step comprises the step of programming at least one of an electronic serial number (ESN), a system identification (SID) number, a Group Identification (GID) number, Local Control (LC) number, a mobile station number (MSN), and a Access Overload Control (ACCOLC).

20. A multiple mode radio telephone handset, comprising:

a first circuit for operating in a first communications system based on one standard;

a second circuit for operating in a second communications system based on another standard, wherein one of said first circuit or said second circuit are used for activating said handset over the air by communication with only one of said first or second communications systems for operation of said handset in both standards;

a microprocessor for controlling the operation of said first and second circuits; and a memory coupled to said microprocessor for storing a mobile station number stored in a subscriber identity module (SIM) card for operation on the one standard, wherein said mobile station number is used in a number assignment module for operation on the other standard.

21. The multiple mode radio telephone handset of claim 20, further comprising a SIM card for storing activation information for operation of said handset in the first and second communications systems.

22. The multiple mode radio telephone handset of claim 21, wherein at least a portion of the activation information is downloaded over the air to the handset and stored in at least one selected memory area of the SIM card.

23. The multiple mode radio telephone handset of claim 22, wherein the activation information is downloaded over the air using at least one SMS class 2 message.

24. The multiple mode radio telephone handset of claim 22, wherein at least another portion of the activation information is pre-stored, prior to providing to an end-user, in another selected memory area of the SIM card.

* * * * *